United States Patent
Aizawa et al.

[11] Patent Number: 6,113,998
[45] Date of Patent: Sep. 5, 2000

[54] METAL/SYNTHETIC RESIN LAMINATE AND SYNTHETIC RESIN-CLAD METALLIC PIPE

[75] Inventors: Katsumi Aizawa, Amagasaki; Yoshihiro Ohtsuka, Otake, both of Japan

[73] Assignee: Daicel Chemical Industries Ltd., Osaka, Japan

[21] Appl. No.: 09/077,832

[22] PCT Filed: Oct. 1, 1997

[86] PCT No.: PCT/JP97/03512

§ 371 Date: Jun. 4, 1998

§ 102(e) Date: Jun. 4, 1998

[87] PCT Pub. No.: WO98/14323

PCT Pub. Date: Apr. 9, 1998

[30] Foreign Application Priority Data

Oct. 4, 1996 [JP] Japan .................................. 8-283085

[51] Int. Cl.[7] .............................. B32B 15/08; B67D 5/02; B67D 5/04; C23F 17/00
[52] U.S. Cl. .................. 428/35.9; 138/143; 138/146; 428/214; 428/414; 428/416; 428/457; 428/475.8; 428/483; 428/515; 428/516; 428/519; 525/208; 525/332.9
[58] Field of Search .................. 428/35.8, 35.9, 428/414, 416; 138/143, 146

[56] References Cited

U.S. PATENT DOCUMENTS

| | | | |
|---|---|---|---|
| 3,834,009 | 9/1974 | Iida et al. ........................ | 29/477 |
| 5,393,818 | 2/1995 | Masse et al. ..................... | 524/270 |
| 5,840,809 | 11/1998 | Ohtsuka et al. ................. | 525/316 |

FOREIGN PATENT DOCUMENTS

| | | | |
|---|---|---|---|
| 5655227 | 5/1981 | Japan ............................ | B29C 27/16 |
| 5812720 | 1/1983 | Japan ............................ | B29C 27/16 |
| 5959418 | 4/1984 | Japan ............................ | B29C 27/10 |
| 6143493 | 5/1994 | Japan ............................ | B32B 15/08 |
| 06246835 | 9/1994 | Japan ............................ | B29C 65/48 |
| 6246835 | 9/1994 | Japan ............................ | B29C 65/48 |

OTHER PUBLICATIONS

Database WPI—Section Ch, Week 199342, Derwent Publications Ltd., London, GB; Class A12, AN 1993–331018 & JP 05 237932 A (Sekisui Chem Ind Co Ltd) Sep. 17, 1993 *Abstract*.

Primary Examiner—Rena L. Dye
Assistant Examiner—Sandra M. Nolan

[57] ABSTRACT

A metal/synthetic resin laminate comprising a metal substrate layer, an epoxy resin-based adhesive layer (a "1st adhesive layer"), an adhesive layer (a "2nd adhesive layer") comprising an epoxidized styrenic thermoplastic elastomer D prepared through epoxidation of a double bond derived from a conjugated diene compound of a block copolymer C comprising a polymer block A composed mainly of a styrenic compound and a polymer block B composed mainly of a conjugated diene compound or a partial hydrogenation product thereof, and a synthetic resin layer; and a synthetic resin-clad metallic pipe wherein the above metal substrate layer is tubular.

24 Claims, No Drawings

METAL/SYNTHETIC RESIN LAMINATE AND SYNTHETIC RESIN-CLAD METALLIC PIPE

CROSS-REFERENCE TO RELATED APPLICATION

This application is the National Phase entry, under 35 USC 371, of International Application PCT/JP 97/03512, filed Oct. 1, 1997.

FIELD OF THE INVENTION

The present invention relates to a metal/synthetic resin laminate wherein a synthetic resin layer is bonded to a metal substrate layer by the mediation of an epoxy resin-based adhesive layer and an adhesive layer formed of a specific epoxidized styrenic thermoplastic elastomer which are provided on the metal substrate layer, and to a synthetic resin-clad metallic pipe wherein the metal substrate layer is tubular.

BACKGROUND ART

Hitherto, coating of a metal substrate with a synthetic resin has been practiced in an attempt to improve corrosion resistance of the metal substrate. For example, a synthetic resin-clad lining pipe wherein an inner surface of the metal pipe is clad with a synthetic resin is manufactured through the diameter-expansion method or the diameter-reduction method.

According to the diameter-expansion method, a metallic pipe and a synthetic resin pipe for cladding are provided in advance and the following processes are performed: an adhesive layer is formed on the inner surface of the metallic pipe; a synthetic resin pipe for cladding is placed inside the metallic pipe; and the synthetic resin pipe for cladding is expanded by the application of heat and pressure, to thereby laminate the synthetic resin layer onto the metallic pipe via the adhesive. This method is disclosed in Japanese Patent Application Laid-Open (kokai) Nos. 56-55227, 58-12720, and 59-59418.

According to the diameter-reduction method, an adhesive layer is provided on the inner surface of a metal pipe, and a synthetic resin pipe placed inside the metallic pipe is press-laminated against the metal pipe by reduction of the diameter of the metal pipe achieved by use of rolls, etc.

With regard to adhesives which may be used in manufacturing such synthetic resin-clad lining pipes, Japanese Patent Application Laid-Open (kokai) No. 56-55227 discloses a polyamide-based or polyester-based adhesive, and Japanese Patent Application Laid-Open (kokai) No. 58-12720 discloses a butadiene-styrene block copolymer elastomer-based hot-melt adhesive. There have also been used other adhesives containing polyolefin which has been copolymerized with an unsaturated aliphatic carboxylic acid or an anhydride thereof.

However, adhesion durability between a metal substrate and a synthetic resin for cladding is not satisfactory even when the above-mentioned adhesives are used for lamination of a synthetic resin on a metal substrate. Since the coefficient of linear expansion of a metal substrate and that of a synthetic resin for cladding significantly differ from each other, a metal/synthetic resin laminate easily permits delamination of the synthetic resin for cladding from the metallic pipe by repeated cooling-heating cycles. Similarly, delamination also occurs after repeated expansion and contraction due to changes in atmospheric temperature. Also, when adhesion between metal and synthetic resin is insufficient, delamination tends to be caused due to application of stress—such as bending, blanking or cutting—to the synthetic-resin-laminated metal. Thus, improvement of adhesion between a metal substrate and a synthetic resin to be laminated is demanded.

DISCLOSURE OF THE INVENTION

The present inventors have conducted studies on adhesives for metals and synthetic resins, and have found that laminates having excellent adhesion between the metal and the synthetic resin and durability against cooling-heating cycles are obtained through combined use of an epoxy resin adhesive and an epoxidized styrenic thermoplastic elastomer. The present invention was accomplished based on this finding.

Accordingly, the present invention provides a metal/synthetic resin laminate comprising a metal substrate layer; an epoxy resin-based adhesive layer (hereinafter referred to as a "1st adhesive layer"); an adhesive layer (hereinafter referred to as a "2nd adhesive layer") comprising an epoxidized styrenic thermoplastic elastomer D prepared by epoxidation of a double bond derived from a conjugated diene compound of a block copolymer C comprising a polymer block A composed mainly of a styrenic compound and a polymer block B composed mainly of a conjugated diene compound or a partial hydrogenation product thereof; and a synthetic resin layer. The present invention also provides a metal/synthetic resin laminate as described above, wherein the 2nd adhesive layer contains epoxidized styrenic thermoplastic elastomer D in an amount of 5–100 wt. %. The present invention further provides a metal/synthetic resin laminate as described above, wherein the epoxidation ratio of epoxidized styrenic thermoplastic elastomer D contained in the 2nd adhesive layer is 10–40%. The present invention still further provides a synthetic-resin-clad metallic pipe, wherein a metallic pipe is laminated with a 1st adhesive layer, a 2nd adhesive layer, and a synthetic resin layer. In addition, the present invention yet further provides a synthetic resin-clad metallic pipe as mentioned above, wherein the inner surface of the metallic pipe is sequentially laminated with the above-described 1st adhesive layer, 2nd adhesive layer, and synthetic resin layer, in this order. The present invention will be described in detail hereunder.

BEST MODES FOR CARRYING OUT THE INVENTION (1) Metal/synthetic resin laminate

The metal/synthetic resin laminate of the present invention comprises a metal substrate layer, a 1st adhesive layer, a 2nd adhesive layer, and a synthetic resin layer.

(2) Metal substrate layer

As a metal substrate that serves as a constituent of the metal/synthetic resin laminate of the present invention, there may be used steel, iron, copper, aluminum, etc. formed into a sheet-like or tubular shape. The metal substrate may have an uneven surface or may be provided with holes. The surface of the metal substrate may be subjected to surface-treatment such as plating with zinc, chromium, etc., phosphating, or chromating in order to enhance corrosion resistance; or degreasing, acid-pickling, or primer-treatment with an organic compound in order to enhance adhesion.

(3) 1st adhesive layer

The metal/synthetic resin laminate of the present invention has a 1st adhesive layer disposed on the above-described metal substrate layer.

The 1st adhesive layer is formed of an epoxy resin-based adhesive (hereinafter referred to as a "1st adhesive"), and examples of epoxy resins which may be used include a bisphenol A-type epoxy resin, a bisphenol F-type epoxy resin, a novolak-type epoxy resin, and an alicyclic epoxy resin. With regard to a setting agent for the epoxy resin, there may be used amine-type setting agents such as aliphatic or aromatic amines, acid anhydride-type setting agents, and cation-type setting agents.

The 1st adhesive layer has a thickness of, preferably, 5–200 μm, particularly preferably 10–50 μm, and it may be formed on one side or both sides of the metal substrate layer.

(4) 2nd adhesive layer

The metal/synthetic resin laminate of the present invention has a 2nd adhesive layer disposed on the 1st adhesive layer. The thickness of the 2nd adhesive layer is preferably 5–500 μm, particularly preferably 50–300 μm.

The adhesive that constitutes the 2nd adhesive layer (hereinafter referred to as a "2nd adhesive") is formed of an epoxidized styrenic thermoplastic elastomer D prepared by epoxidation of a double bond derived from a conjugated diene compound of a block copolymer C comprising a polymer block A composed mainly of a styrenic compound and a polymer block B composed mainly of a conjugated diene compound or a partial hydrogenation product thereof.

The "styrenic compound" that constitutes the polymer block A may be one or more species selected from among styrene, α-methylstyrene, vinyltoluene, p-tert-butylstyrene, divinylbenzene, p-methylstyrene, 1,1-diphenylstyrene, vinylnaphthalene, and vinylanthracene. Of these, styrene is preferred.

The "conjugated diene compound" that constitutes the polymer block B may be one or more species selected from among butadiene, isoprene, 1,3-pentadiene, 2,3-dimethyl-1, 3-butadiene, piperylene, 3-butyl-1,3-octadiene, and phenyl-1,3-butadiene. Of these, butadiene, isoprene, and combinations thereof are preferred.

The "block copolymer C" used in the present invention contains a styrenic compound structure unit in an amount of preferably 5–70 wt. %, more preferably 10–60 wt. %. The weight average molecular weight of the block copolymer C is preferably 5,000–600,000, more preferably 10,000–500,000, and the molecular weight distribution [ratio (Mw/Mn) of weight average molecular weight (Mw) to number average molecular weight (Mn)] is preferably 10 or less. The block copolymer C preferably has a linear molecular structure. For example, a styrenic compound-conjugated diene compound block copolymer having a structure such as A-B-A, B-A-B-A, or A-B-A-B-A is preferred. The molecule may have a polyfunctional group derived from residue of a coupling agent at an end of the molecule.

No particular limitation is imposed on the method for manufacturing the block copolymer C so long as a polymer having the above-described structure is obtained. Styrenic compound-conjugated diene compound block copolymers may be manufactured by use of a lithium catalyst, etc. in an inert solvent in accordance with a method described in Japanese Patent Publication (kokoku) Nos. 40-23789, 43-17979, 46-32415, and 56-28925. Furthermore, partially hydrogenated block copolymers which serve as starting materials for epoxy-modified block copolymers employed for the present invention may be manufactured through hydrogenation in the presence of a hydrogenation catalyst in an inert solvent in accordance with a method described in Japanese Patent Publication (kokoku) Nos. 42-8704 and 43-6636 or Japanese Patent Application Laid-Open (kokai) No. 59-133203. Degree of hydrogenation may be determined through an NMR analysis of the block copolymers before and after hydrogenation.

In the present invention, a hydrogenation ratio is defined as the percentage of hydrogenated double bonds with respect to the double bonds derived from a conjugated diene compound of unhydrogenated and unepoxidized, starting block copolymers. The hydrogenation ratio is preferably 0–80%, particularly preferably 10–70%, since an epoxidized styrenic thermoplastic elastomer D having excellent heat resistance and cohesion characteristics is obtained within the above range.

The epoxidized styrenic thermoplastic elastomer D which may be used in the present invention may be obtained through epoxidation of the above-described block copolymer C. Epoxidation may be conducted through reaction of the above-described block copolymer C with an epoxidizing agent such as hydroperoxide or peracid in an inert solvent.

In the present invention, the "inert solvent" is used in order to decrease viscosity of starting materials and dilute the epoxidizing agent to stabilize, and examples thereof which may be used include hexane, cyclohexane, toluene, benzene, ethyl acetate, carbon tetrachloride, and chloroform.

Examples of the "hydroperoxides" serving as the epoxidizing agent include hydrogen peroxide, tertiary butyl hydroperoxide, and cumene hydroperoxide. Examples of the "peracids" include performic acid, peracetic acid, perbenzoic acid, and trifluoroperacetic acid. Of these, peracetic acid is preferred in that it is industrially manufactured on a large scale, economically available, and has a high degree of stability.

No strict limitation is imposed on the amount of an epoxidizing agent used, and it may appropriately be selected according to species of the used epoxidizing agent, desired epoxidation degree, and differences in properties of block copolymers used.

A "catalyst" may optionally be used at epoxidation. For example, when peracid is used, an alkali such as sodium carbonate and an acid such as sulfuric acid may be used as the catalyst, whereas when hydroperoxide is used, there may be used combinations of a tungstic acid—caustic soda mixture and hydrogen peroxide; an organic acid and hydrogen peroxide; or molybdenum hexacarbonyl and tertiary butyl hydroperoxide to obtain catalytic effects.

No strict limitation is imposed on the conditions of epoxidation. For example, the reaction temperature is preferably 0–70° C. when peracetic acid is used, since peracetic acid decomposes at temperatures greater than 70° C. The reaction temperature of epoxidation may be selected according to a customary method depending on reactivity of the epoxidizing agent used. No particular operation is needed in relation to the reaction mixture, and a mixture of starting materials is simply stirred for 2–10 hours.

Isolation of the resultant epoxidized styrenic thermoplastic elastomer D may be conducted through different methods; e.g., precipitation in a poor solvent; projection of the epoxidized styrenic thermoplastic elastomer D in hot water with stirring to remove the solvent by distillation; or direct drying to remove the solvent by heating and/or pressure-reducing operation. In the case in which the ultimate use occurs in the form of liquid, the solution may be used without being subjected to the isolation step.

The epoxidation ratio of the epoxidized styrenic thermoplastic elastomer of the present invention is defined as the percentage of epoxidized double bonds with respect to the double bonds derived from a conjugated diene compound of an unhydrogenated/unepoxidized block copolymer C, and is represented by the following equation by use of epoxy equivalent (N): Epoxidation ratio=$\{10000 \times D + 2 \times H \times (100-S)\}/\{(N-16) \times (100-S)\}$ wherein D represents the molecular weight of diene compound; H represents the hydrogenation ratio (%); and S represents the styrenic compound content (wt. %).

In the present invention, the epoxy equivalent (N) of epoxidized styrenic thermoplastic elastomer D is obtained through titration with 0.1 N solution of hydrobromic acid and may be represented by the following equation:

Epoxy equivalent (N)=10000×W/(f×V)

wherein W represents the weight of the epoxidized styrenic thermoplastic elastomer to be titrated; V represents consumption of the solution of hydrobromic acid in milli milliliter at titration; and f represents the factor of the solution of hydrobromic acid.

The epoxidized styrenic thermoplastic elastomer D of the present invention has an epoxidation ratio of preferably 10–40%, particularly preferably 15–35%. When the ratio is less than 10%, the effect of the present invention is not satisfactory, whereas when it is in excess of 40%, reactivity attributed to epoxy groups increases considerably to result in easy gelling and low thermal stability.

In the case in which thermal stability is strongly sought, the percentage of bonds remaining unsaturated, which are derived from a conjugated diene compound subjected to neither hydrogenation nor epoxidation, is preferably less than 90% of the entirety, with 40% or less being particularly preferred.

In the present invention, the 2nd adhesive contains epoxidized styrenic thermoplastic elastomer D in an amount of preferably 5–100 wt. %, particularly preferably 20–100 wt. %, since satisfactory adhesion is obtained within the above range.

Examples of other components which may be incorporated into the 2nd adhesive are as follows.

1) Examples of thermoplastic resins include polyolefin-based resins, polyamide-based resins, polyester-based resins, terpene-phenolic resins, and alicyclic saturated hydrocarbon resins. These thermoplastic resins may be incorporated into the 2nd adhesive in amounts of 0–80 wt. %.

2) Examples of thermosetting resins which may be incorporated into an adhesive used for metal-vinyl chloride-based resins include epoxy-based resins, phenol-based resins, urea-based resins, and melamine-based resins. These thermosetting resins may be incorporated into the 2nd adhesive in amounts of 0–80 wt. %.

3) Examples of resin tackifiers which may be incorporated include rosin, terpene-based resins, aliphatic hydrocarbon resins, aromatic hydrocarbon resins, phenol-based resins, and cumarone-indene-based resins. These resin tackifiers may be incorporated into the 2nd adhesive in amounts of 0–80 wt. %.

4) Examples of inorganic fillers which may be incorporated include calcium carbonate barium sulfate, silica, talc, clay, titanium oxide, magnesium carbonate, and carbon black. These may be incorporated into the 2nd adhesive in amounts of 0–60 wt. %.

5) Examples of fluidity-modifiers which may be incorporated include naphthene-based, aroma, and paraffin-based oil. These may be incorporated into the 2nd adhesive in amounts of 0–60 wt. %.

6) Examples of plasticizers which may be incorporated include dioctyl phthalate (DOP) and dibutyl phthalate (DBP). These may be incorporated into the 2nd adhesive in amounts of 0–60 wt. %.

7) Other than the above-described components, stabilizers such as anti-oxidants and UV-absorbers; colorants; pigments; may be added.

Examples of methods for manufacturing the 2nd adhesive include melt-mixing of the epoxidized styrenic thermoplastic elastomer D and optional components; or dissolving the epoxidized styrenic thermoplastic elastomer D in a solvent and mixing other components. These components are typically mixed with a kneader, a seal-type kneader, an extruder, a mixing roll, a Banbury mixer, etc. with the application of heat in an optional inert gas atmosphere.

(5) Synthetic resin layer

Examples of synthetic resins that constitute metal/synthetic resin laminates of the present invention include vinyl chloride-based resins, olefin-based resins, polyester-based resins, and polyamide-based resins. Of these, vinyl chloride-based resins are particularly preferred.

When vinyl chloride-based resins are used as the synthetic resins, there may be used one or more species selected from among vinyl chloride resins; copolymers of a vinyl chloride monomer and monomers copolymerizable with the vinyl chloride monomer; and post-chlorinated vinyl chloride-based resins obtained through post-chlorination of a vinyl chloride resin. Examples of the copolymers of a vinyl chloride monomer and monomers copolymerizable with the vinyl chloride monomer include vinyl chloride-styrene copolymers, vinyl chloride-ethylene copolymers, and vinyl chloride-ethylene-vinyl acetate copolymers.

The metal/synthetic resin laminate of the present invention comprises a metal substrate layer (M layer), a 1st adhesive layer (B1 layer), a 2nd adhesive layer (B2 layer), and a synthetic resin layer (P layer) with a structure of M layer-B1 layer-B2 layer-P layer. The present invention also encompasses a laminate comprising a metal substrate layer of which both surfaces are sequentially laminated with B1 layers, B2 layers, and P layers, i.e., a laminate of a 7-layer structure (P layer-B2 layer-B1 layer-M layer-B1 layer-B2 layer-P layer).

The 1st adhesive used in the metal/synthetic resin laminate of the present invention exhibits excellent adhesion to metals and affinity with the epoxidized styrenic thermoplastic elastomer D used as the 2nd adhesive. The 2nd adhesive also has excellent adhesion to synthetic resins. Consequently, each of the layers in the obtained metal/synthetic resin laminate exhibits strong adhesion to its adjacent layers. Since the 2nd adhesive layer has appropriate elasticity, the layer absorbs contraction stress attributed to difference between linear expansion coefficients of the synthetic resin and the metal substrate, even at evaluation of durability such as a cooling-heating cycle test, to reinforce adhesion between the metal substrate and the synthetic resin exhibiting a large difference in linear expansion coefficient.

The metal/synthetic resin laminate of the present invention is manufactured in accordance with a known method, e.g., application of the 1st adhesive and the 2nd adhesive in the form of solution on a metal sheet subjected to pretreatment such as degreasing; drying to form each of the adhesive layers; and pressing with a synthetic resin sheet under heat.

(6) Synthetic resin-clad metallic pipe

The synthetic resin-clad metallic pipe of the present invention comprises a metallic pipe sequentially laminated with a 1st adhesive layer (B1 layer), a 2nd adhesive layer (B2 layer), and a synthetic resin layer (P layer) in this order. The inner surface of the metallic pipe may be sequentially laminated with B1 layer-B2 layer-P layer in this order. The present invention also includes a laminate comprising a metallic pipe (M layer) of which both surfaces are sequentially laminated with B1 layers, B2 layers, and P layers in this order, i.e., a laminate of a 7-layer structure (P layer-B2 layer-B1 layer-M layer-B1 layer-B2 layer-P layer).

The synthetic resin-clad metallic pipe of the present invention may be manufactured through a diameter-expansion method including the steps of applying the 2nd adhesive at first and then the 1st adhesive in the form of solution onto the outer surface of a synthetic resin pipe, drying to form each of the adhesive layers, insertion of the resin pipe into the metallic pipe, and heating or pressurizing the resin pipe; or through a diameter-reduction method, etc.

The synthetic resin-clad metallic pipe of the present invention effectively prevents corrosion of the metallic pipe, due to strong adhesion of the synthetic resin layer. When the pipe is used as a lining pipe disposed at a place where a large temperature difference is present, the pipe also prevents delamination of the clad resin layer induced by the temperature difference.

EXAMPLES

The present invention will next be described in detail by way of examples, which should not be construed as limiting the invention. As used herein, "%" means "wt. %" unless otherwise indicated.

Manufacture Example 1

A linear polystyrene-polybutadiene-polystyrene block copolymer ("TR2000," styrene content 40%, product of Japan Synthetic Rubber Co., Ltd.) (300 g) and ethyl acetate (1,500 g) were placed in a reactor having a jacket and equipped with a stirrer, a reflux condenser, and a thermometer, and the mixture was allowed to dissolve. An ethyl acetate solution (169 g) containing 30% peracetic acid was then continuously added dropwise thereto, and the mixture was allowed to react for three hours under stirring to cause epoxidation at 40° C. The reaction mixture was cooled to ambient temperature and removed from the reactor. A large amount of methanol was added thereto to precipitate a polymer, which was separated, washed with water, and dried to thereby obtain an epoxidized styrenic thermoplastic elastomer (elastomer A) having an epoxy equivalent of 470 (epoxidation ratio=19%).

Manufacture Example 2

A linear polystyrene-polybutadiene-polystyrene block copolymer ("TR2000," styrene content 40%, product of Japan Synthetic Rubber Co., Ltd.) (300 g) and cyclohexane (3,000 g) were placed in a reactor having a jacket and equipped with a stirrer and a thermometer, and the mixture was allowed to dissolve. A di-p-tolylbis(1-cyclopentadienyl) titanium/cyclohexane solution (concentration 1 mmol/l) (40 ml) and an n-butyllithium solution (concentration 5 mmol/l) (8 ml) were mixed at 0° C. under hydrogen at a pressure of 2.0 kg/cm$^2$ to obtain a hydrogenation catalyst. The catalyst was added to the mixture and the resultant mixture was allowed to react at the partial pressure of hydrogen of 2.5 kg/cm2 for 30 minutes.

The obtained solution of a partial hydrogenation polymer was dried under reduced pressure to remove the solvent (hydrogenation ratio of total double bonds derived from butadiene: 30%). The partial hydrogenation polymer (300 g) and cyclohexane (1500 g) were placed in a reactor having a jacket and equipped with a stirrer, a reflux condenser, and a thermometer, and the mixture was allowed to dissolve. An ethyl acetate solution (300 g) containing 30% of peracetic acid was then continuously added dropwise thereto, and the mixture was allowed to react for three hours under stirring to cause epoxidation at 40° C. The reaction mixture was cooled to ambient temperature and removed from the reactor. A large amount of methanol was added thereto to precipitate a polymer, which was separated, washed with water, and dried to thereby obtain an epoxidized styrenic thermoplastic elastomer (elastomer B) having an epoxy equivalent of 275 (epoxidation ratio=33.6%).

Example 1

As the 1st adhesive, an epoxy resin and a setting agent were dissolved to form a composition specified in Table 1 in toluene so that the solid content thereof became 50 wt. %. As the 2nd adhesive, the elastomer A obtained through Manufacture Example 1 and a tackifier specified in Table 1 were dissolved in toluene so that the solid content thereof became 50 wt. %.

Next, a cold-rolled steel (JIS G3141) sheet of 25 mm×125 mm×1.6 mm (thickness) was surface-degreased with methanol and an area thereof (25 mm×60 mm) was sequentially coated with a 1st adhesive and 2nd adhesive in this order to a thickness of 50 μm and 150 μm, respectively, and the adhesives were dried. The sheet was laminated with a flexible vinyl chloride (chlorinated vinyl chloride) sheet of 25 mm×180 mm×0.5 mm (thickness) and the laminate was pressed at 150° C. for five minutes with a pressure of 2 kgf/cm$^2$, to thereby obtain a metal/synthetic resin laminate. The 180 degree peeling strength and shear strength of the sheet were measured and the results are shown in Table 1.

The 2nd adhesive and 1st adhesive prepared above were applied, in this order, to the outer surface of a chlorinated vinyl chloride sheet synthetic resin pipe having an outside diameter of 49 mm so that the thicknesses became 150 μm and 50 μm, respectively, and were dried. The resin pipe was inserted into a steel pipe having an inside diameter of 50 mm and the synthetic resin pipe was heated at 150–190° C. and pressurized to thereby obtain a synthetic resin-clad metallic pipe, which was subjected to a cooling-heating cycle test. The results are shown in Table 1.

Examples 2 through 5

The procedure of Example 1 was performed through use of 1st adhesives and 2nd adhesives shown in Table 1, to thereby obtain metal/synthetic resin laminates and synthetic resin-clad metallic pipes. The 180 degree peeling strength and tensile shear strength thereof were measured, and a cooling-heating cycle test was performed in the manner described in Example 1. The results are shown in Tables 1 and 2.

Comparative Example 1

The procedure of Example 1 was performed through use of an unepoxidized styrenic elastomer C as the 2nd adhesive, to thereby obtain a metal/synthetic resin laminate and a synthetic resin-clad metallic pipe. The 180 degree peeling strength and tensile shear strength thereof were measured, and a cooling-heating cycle test was performed in the manner described in Example 1. The results are shown in Table 2. The results show that poor adhesion was obtained after the cooling-heating cycle test, due to low 180 degree peeling strength and tensile shear strength even though the 2nd adhesive layer had appropriate elasticity.

Comparative Example 2

The procedure of Example 1 was performed through exclusive use of the 2nd adhesive layer for adhesion without use of a 1st adhesive, to thereby obtain a metal/synthetic resin laminate and a synthetic resin-clad metallic pipe. The 180 degree peeling strength and tensile shear strength were measured, and a cooling-heating cycle test was performed in the manner described in Example 1. The results are shown in Table 2. The results show that poor adhesion was obtained after the cooling-heating cycle test, due to low tensile shear strength even though the 2nd adhesive layer had appropriate elasticity.

Comparative Example 3

The procedure of Example 1 was performed through exclusive use of the 1st adhesive layer for adhesion without use of a 2nd adhesive layer, to thereby obtain a metal/synthetic resin laminate and a synthetic resin-clad metallic pipe. The 180 degree peeling strength and tensile shear strength were measured, and a cooling-heating cycle test was performed in the manner described in Example 1. The results are shown in Table 2. As shown in the results, poor adhesion was obtained after the cooling-heating cycle test, since contraction stress attributed to difference between linear expansion coefficients was absorbed due to the absence of the 2nd adhesive layer having appropriate elasticity.

TABLE 1

|  | Example 1 | Example 2 | Example 3 | Example 4 |
| --- | --- | --- | --- | --- |
| Steel sheet or steel pipe serving as a metal substrate | Degreasing treatment | Degreasing treatment | Degreasing treatment | Degreasing treatment |
| Composition of 1st adhesive layer (parts by weight) | | | | |
| Epikote 1001*1 | 100 | 100 | 100 | 100 |
| DICY*2 | 6 | | | |
| TMA*3 | | 16 | | |
| TETA*4 | | | 6 | |
| 2nd adhesive layer | | | | |
| Styrene elastomer A | 50 | 50 | 50 | |
| Styrene elastomer B | | | | 50 |
| YS Polystar T145*6 | 50 | 50 | 50 | 50 |
| Harimac T80*7 | | | | |
| Evaluation of adhesion strength | | | | |
| 180 Deg. peeling strength (kgf/25 mm) | >5.7 | >5.3 | >5.5 | >5.6 |
| Tensile shear strength (kgf/25 mm$^2$) | 56.8 | 47.8 | 59.8 | 57.1 |
| Cycle test | | | | |
| State of initial adhesion | ○ | ○ | ○ | ○ |
| After 70 coolong/heating cycles | ○ | ○ | ○ | ○ |

*1: Epoxy resin; bisphenol A-type epoxy resin, product of Yuka Shell Epoxy Co., Ltd.
*2: Setting agent; "dicyanediamide"
*3: Setting agent; "trimellitic acid"
*4: Setting agent; "triethylenetetramine"
*6: Tackifier; terpene-phenolic resin, product of Yasuhara Chemical, Co., Ltd.
*7: Tackifier; rosin-modified maleic acid resin "Harimac T-80," product of Harima Chemicals, Inc.

TABLE 2

|  | Example 5 | Com. Ex. 1 | Com. Ex. 2 | Com. Ex. 3 |
| --- | --- | --- | --- | --- |
| Steel sheet serving as a metal substrate | Degreasing treatment | Degreasing treatment | Degreasing treatment | Degreasing treatment |
| Composition of 1st adhesive layer (parts by weight) | | | | |
| Epikote 1001*1 | 100 | 100 | | 100 |
| DICY*2 | 6 | 6 | | 6 |
| 2nd adhesive layer | | | | |
| Styrene elastomer A | 50 | | 50 | |
| Styrene elastomer C*5 | | 50 | | |
| YS Polystar T145*6 | | 50 | 50 | |
| Harimac T80*7 | 50 | | | |
| Evaluation of adhesion strength | | | | |
| 180 Deg. peeling strength (kgf/25 mm) | >5.7 | 1.4 | >5.3 | 0.2 |
| Tensile shear strength (kgf/25 mm$^2$) | 48.2 | 28.2 | 34.1 | 81.4 |
| Cycle test | | | | |
| State of initial adhesion | ○ | ○ | ○ | ○ |
| After 70 coolong/heating cycles | ○ | Δ | Δ | X |

*1: Epoxy resin; bisphenol A-type epoxy resin, product of Yuka Shell Epoxy Co., Ltd.
*2: Setting agent; "dicyanediamide"
*5: "TR 2000," styrene content 40%, product of Japan Synthetic Rubber Co., Ltd.
*6: Tackifier; terpene-phenolic resin, product of Yasuhara Chemical, Co., Ltd.
*7: Tackifier; rosin-modified maleic acid resin "Harimac T-80," product of Harima Chemicals, Inc.

(Evaluation tests)

(1) 180 Degree peeling test

The synthetic resin layer of a metal/synthetic resin laminate was cut on three sides of a 25 mm×250 mm square and the square was peeled at an angle of 180° to the sheet at the peeling rate of 100 mm/minute and 23° C. The unit of peeling strength is kgf/mm.

(2) Tensile shear test

The test was conducted for a metal/synthetic resin laminate with a tensile speed of 10 mm/minute at 23° C., to thereby measure the shear strength.

(3) Cooling-heating cycle test

Initial adhesion of a synthetic resin-clad metallic pipe was evaluated by visual observation. The pipe was subjected to 70 cooling-heating cycles, i.e., dipping for 5 minutes in cold water at 23° C. and dipping for 5 minutes in hot water at 85° C., then the adhesion state was evaluated by visual observation. Evaluation is categorized as follows:

◯: State where no delamination was observed between the metallic pipe and chlorinated vinyl chloride material.

Δ: State where partial delamination was observed between the metallic pipe and chlorinated vinyl chloride material.

×: State where apparent delamination was observed between the metallic pipe and chlorinated vinyl chloride material.

Industrial Applicability

The present invention provides a metal/synthetic resin laminate having excellent adhesion, wherein adhesion between the metal substrate and the synthetic resin layer is achieved through combination of two specific adhesives. Since the 1st adhesive is an epoxy resin-based adhesive exhibiting excellent adhesion both to the metal substrate and the 2nd adhesive, a metal/synthetic resin laminate exhibiting high adhesion strength to metal substrates can be obtained. Moreover, the 2nd adhesive absorbs strain attributed to difference between linear expansion coefficient of a synthetic resin and that of a metal effectively, because it contains as the primary component an epoxidized styrenic thermoplastic elastomer having a specific structure. Therefore, there may be obtained metal/synthetic resin laminates and synthetic resin-clad metallic pipes exhibiting excellent durability in, for example, cooling-heating cycle tests.

What is claimed is:

1. A metal/synthetic resin laminate comprising a metal substrate layer; an epoxy resin-based adhesive layer (a "1st adhesive layer"); an adhesive layer (a "2nd adhesive layer") comprising an epoxidized styrenic thermoplastic elastomer D prepared by epoxidation of a double bond derived from a conjugated diene compound of a block copolymer C comprising a polymer block A composed mainly of a styrenic compound and a polymer block B composed mainly of a conjugated diene compound or a partial hydrogenation product thereof; and a synthetic resin layer;

wherein said 1st adhesive layer is adherent to the metal substrate layer and has affinity with the thermoplastic elastomer D of the 2nd adhesive layer and said second adhesive layer, which is different than the 1st adhesive layer, is adherent to the synthetic resin layer and provides elasticity to absorb contraction stress resulting from differences in linear expansion coefficients of the synthetic resin and the metal substrate.

2. The metal/synthetic resin laminate according to claim 1, wherein the 2nd adhesive layer comprises an adhesive containing the epoxidized styrenic thermoplastic elastomer D in an amount of 5–100 wt. %.

3. The metal/synthetic resin laminate according to claim 1 or 2, wherein the epoxidation ratio of the epoxidized styrenic thermoplastic elastomer D contained in the 2nd adhesive layer is 10–40%.

4. A synthetic-resin-clad metallic pipe, wherein a metallic pipe is laminated with an epoxy resin-based adhesive layer (a "1st adhesive layer"); an adhesive layer (a "2nd adhesive layer") comprising an epoxidized styrenic thermoplastic elastomer D prepared by epoxidation of a double bond derived from a conjugated diene compound of a block copolymer C comprising a polymer block A composed mainly of a styrenic compound and a polymer block B composed mainly of a conjugated diene compound or a partial hydrogenation product thereof; and a synthetic resin layer;

wherein said 1st adhesive layer is adherent to the metallic pipe and has affinity with the thermoplastic elastomer D of the 2nd adhesive layer and said second adhesive layer, which is different than the 1st adhesive layer, is adherent to the synthetic resin layer and provides elasticity to absorb contraction stress resulting from differences in linear expansion coefficients of the synthetic resin and the metal substrate.

5. The synthetic-resin-clad metallic pipe according to claim 4, wherein the inner surface of the metallic pipe is sequentially laminated with an epoxy resin-based adhesive layer (a "1st adhesive layer"); an adhesive layer (a "2nd adhesive layer") comprising an epoxidized styrenic thermoplastic elastomer D prepared by epoxidation of a double bond derived from a conjugated diene compound of a block copolymer C comprising a polymer block A composed mainly of a styrenic compound and a polymer block B composed mainly of a conjugated diene compound or a partial hydrogenation product thereof; and a synthetic resin layer, in this order.

6. The metal/synthetic resin laminate according to claim 1 or claim 2, wherein the 1st adhesive layer comprises an epoxy resin selected from the group consisting of bisphenol A epoxy resins, bisphenol F epoxy resins, novolak epoxy resins and alicyclic epoxy resins.

7. The metal/synthetic resin laminate according to claim 6, wherein the 1st adhesive layer further comprises a setting agent for the epoxy resin, said setting agent being selected from the group consisting of amine setting agents, acid anhydride setting agents and cation setting agents.

8. The metal/synthetic resin laminate according to claim 7, wherein the epoxidation ratio of the epoxidized styrenic thermoplastic elastomer D contained in the 2nd adhesive layer is from 10 to 40%.

9. The metal/synthetic resin laminate according to claim 8, wherein the epoxidation ratio is from 15 to 35%.

10. The metal/synthetic resin laminate according to claim 1, wherein the 1st adhesive layer has a thickness of from 5 to 200 μm and the 2nd adhesive layer has a thickness of from 5 to 500 μm.

11. The metal/synthetic resin laminate according to claim 1, wherein the 1st adhesive layer has a thickness of from 10 to 50 μm and the 2nd adhesive layer has a thickness of from 50 to 300 μm.

12. The metal/synthetic resin laminate according to claim 1, comprising a seven layer structure comprising synthetic resin layer/2nd adhesive layer/1st adhesive layer/metal layer/1st adhesive layer/2nd adhesive layer/synthetic resin layer.

13. The metal/synthetic resin laminate according to claim 1, wherein the percentage of conjugated double bonds in polymer block B, based on the total of conjugated double bonds, hydrogenated double bonds and epoxidized double bonds is less than 40%.

14. The metal/synthetic resin laminate according to claim 1, wherein the synthetic resin layer comprises olefin resin, polyester resin or polyamide resin.

15. The metal/synthetic resin laminate according to claim 1, wherein the synthetic resin layer comprises vinyl chloride resin.

16. The synthetic-resin-clad metallic pipe according to claim 4 or claim 5, wherein the 1st adhesive layer comprises an epoxy resin selected from the group consisting of bisphenol A epoxy resins, bisphenol F epoxy resins, novolak epoxy resins and alicyclic epoxy resins.

17. The synthetic-resin-clad metallic pipe according to claim 16, wherein the 1st adhesive layer further comprises a setting agent for the epoxy resin, said setting agent being selected from the group consisting of amine setting agents, acid anhydride setting agents and cation setting agents.

18. The synthetic-resin-clad metallic pipe according to claim 17, wherein the epoxidation ratio of the epoxidized styrenic thermoplastic elastomer D contained in the 2nd adhesive layer is from 10 to 40%.

19. The synthetic-resin-clad metallic pipe according to claim 18, wherein the epoxidation ratio is from 15 to 35%.

20. The synthetic-resin-clad metallic pipe according to claim 4 or claim 5, wherein the 1st adhesive layer has a thickness of from 5 to 200 $\mu$m and the 2nd adhesive layer has a thickness of from 5 to 500 $\mu$m.

21. The synthetic-resin-clad metallic pipe according to claim 4 or claim 5, wherein the 1st adhesive layer has a thickness of from 10 to 50 $\mu$m and the 2nd adhesive layer has a thickness of from 50 to 300 $\mu$m.

22. The synthetic-resin-clad metallic pipe according to claim 4, comprising a seven layer structure comprising synthetic resin layer/2nd adhesive layer/1st adhesive layer/metal pipe/1st adhesive layer/2nd adhesive layer/synthetic resin layer.

23. The synthetic-resin-clad metallic pipe according to claim 4 or claim 5, wherein the percentage of conjugated double bonds in polymer block B, based on the total of conjugated double bonds, hydrogenated double bonds and epoxidized double bonds is less than 40%.

24. The metal/synthetic resin laminate according to claim 4 or claim 5, wherein the synthetic resin layer comprises vinyl chloride resin, olefin resin, polyester resin or polyamide resin.

* * * * *